July 4, 1939.  B. M. BIRD  2,164,796
METHOD AND APPARATUS FOR FEEDING COAL
Filed May 20, 1936   2 Sheets-Sheet 1
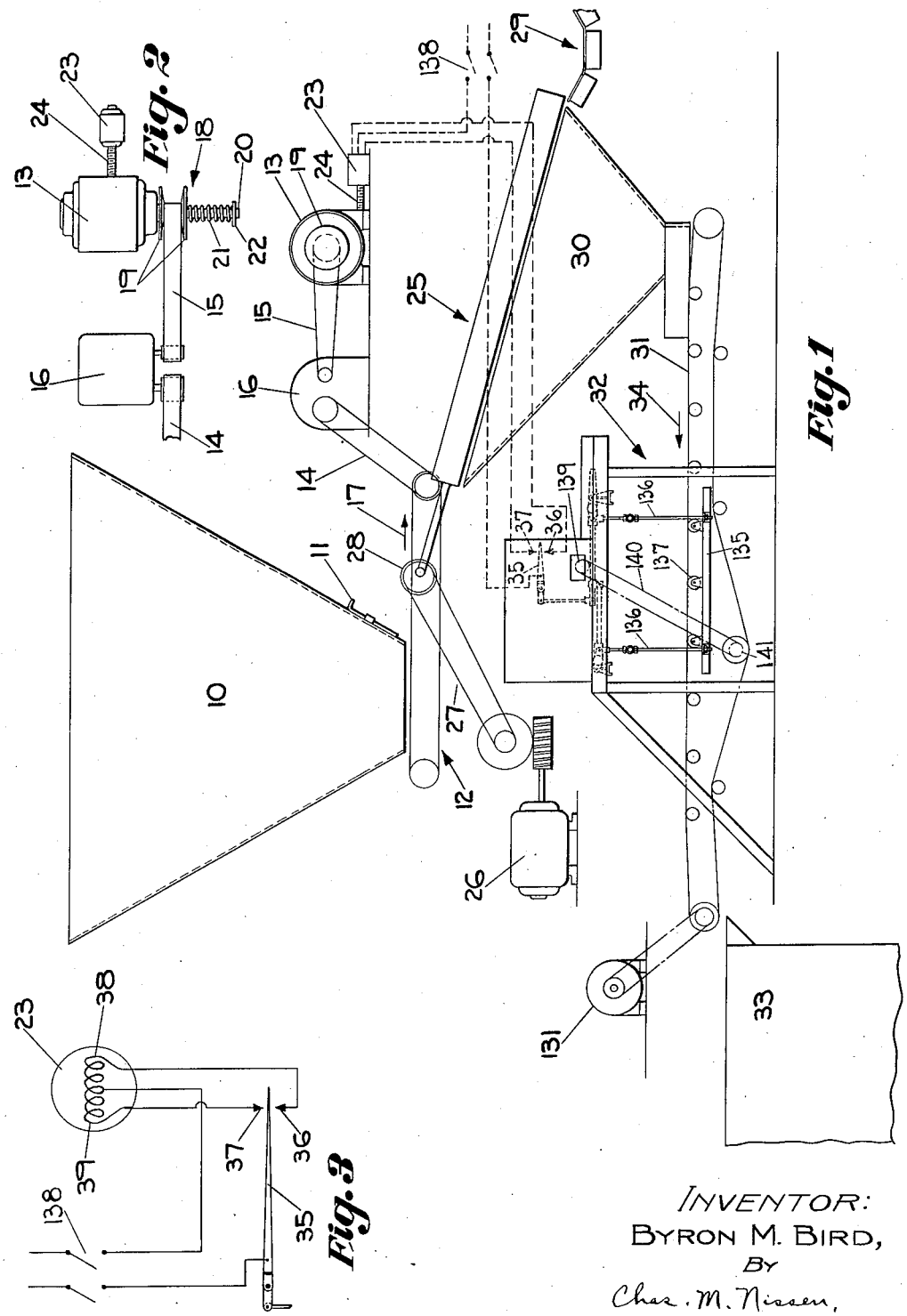
INVENTOR:
BYRON M. BIRD,
By
Chas. M. Nissen,
ATT'Y.

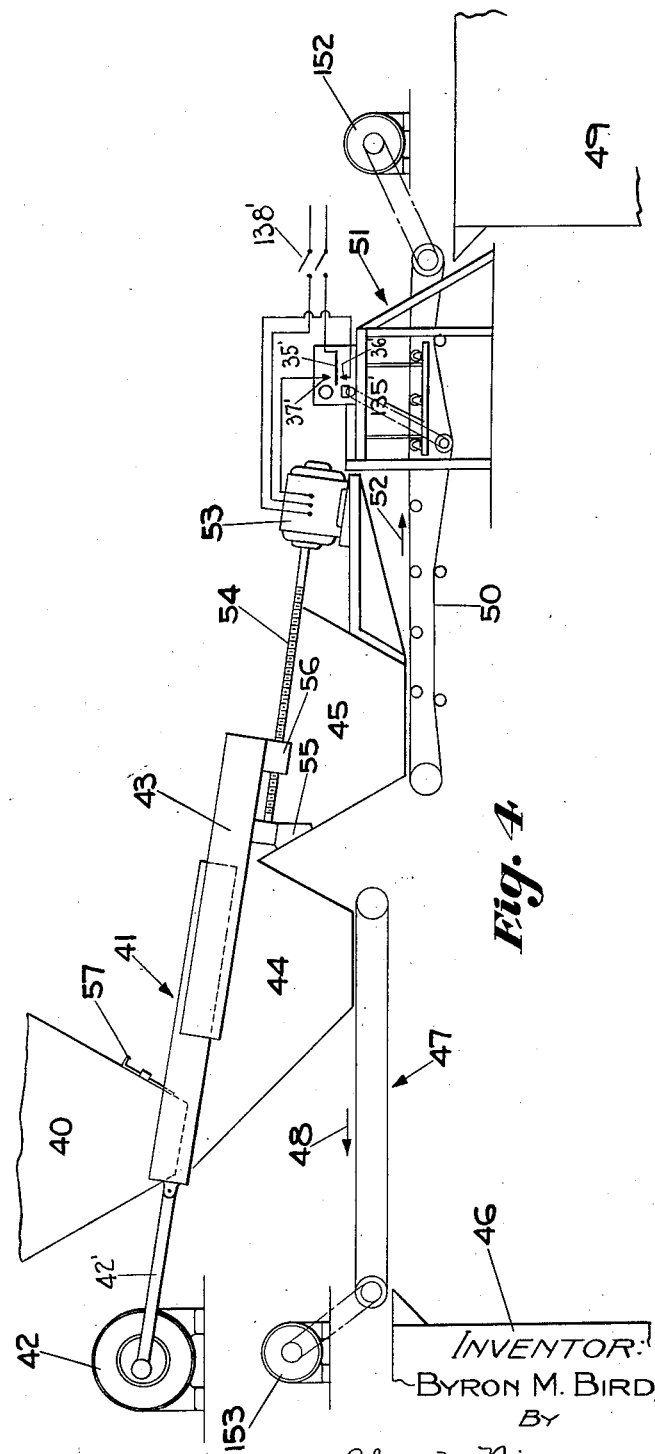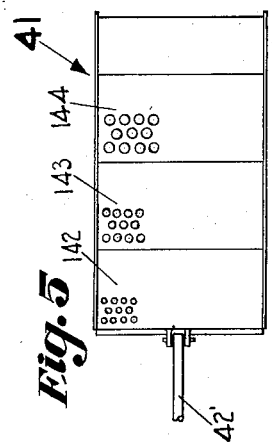

Patented July 4, 1939

2,164,796

UNITED STATES PATENT OFFICE 2,164,796

METHOD AND APPARATUS FOR FEEDING COAL

Byron M. Bird, Columbus, Ohio, assignor, by mesne assignments, to The Traylor Vibrator Company, a corporation of Colorado Application May 20, 1936, Serial No. 80,822

11 Claims. (Cl. 209—44)

This invention relates to feeding apparatus and although it is particularly adapted to feeding a mixture of coal and impurities to jigs, it may have a general application.

One of the objects of the present invention is the provision of a new and improved method of and apparatus for feeding raw coal from storage to a jig whereby the rate of feed to said jig will be automatically maintained substantially constant at all times.

Another object of the invention is the provision of a new and improved method and apparatus for separating coal to be cleaned, according to predetermined size ranges, and again separating one of the size ranges according to additional size ranges and separately feeding the material at constant rates to separate and independent jigs.

A further object of the invention is to provide a system of distribution of material which reduces to a minimum the amount of necessary apparatus in a complete coal cleaning plant, while at the same time enhancing the efficiency of operation.

More particularly it is the object of the present invention to convey material to a screen and direct the screenings to a conveyor driven at a constant rate of speed but so associated with a weightometer and electrical mechanism controlled thereby, as to regulate the feed to the screen and thereby secure a constant rate of feed as to weight of material, from the conveyor which is associated with the weightometer.

It is also the object of the present invention to provide independently or in association with such system of distribution, another screening and separating device for directing material to two constantly driven conveyors, one of which is associated with the weightometer and mechanism controlled thereby for regulating the separation of the material and the direction of the separated material to the two conveyors.

Other objects of the invention will appear hereinafter, the novel features and combinations being set forth in the appended claims.

In the accompanying drawings,

Fig. 1 is a diagrammatic side elevational view of a system comprising my invention which is capable of carrying out the method of my invention;

Fig. 2 is a plan view of a portion of the system of Fig. 1;

Fig. 3 is a circuit diagram for a control motor of the system;

Fig. 4 is a diagrammatic side elevational view of a modified form of apparatus comprising my invention which may be also employed to carry out the method of my invention; and Fig. 5 is a plan view of the shaking screen of the system of Fig. 4.

Referring first to Fig. 1 of the drawings, there is shown a complete system for cleaning coal comprising a large storage hopper 10 which, for example, may have a capacity of 300 tons and which is adapted to receive run of mine coal from a coal mine, either continuously or in batch loads.

The hopper 10 is provided with a variably controlled slide gate 11, the lower edge of which forms one of the transverse edges of the open bottom of the hopper 10. The elevation of the gate 11 therefore predetermines the effective area of the open bottom of the hopper 10. In this manner the position of the gate 11 controls the discharge of the coal and impurities from the hopper 10 onto the belt conveyor 12 which is driven from an electric motor 13 through appropriate variable speed driving mechanism 18 and a speed reduction device 16. The gate 11 may be so adjusted that the hopper 10 will deliver any desired amount of material to the belt conveyor 12, in accordance with the rate of speed at which the belt conveyor 12 is driven.

In order to vary the amount of material delivered by the belt conveyor 12 in the direction of the arrow 17 of Fig. 1, the electric motor 13 is provided with a well known form of variable speed drive mechanism 18 which cooperates with the V-type belt 15. This variable speed drive mechanism 18 comprises a pulley formed by a pair of cone disks 19 carried on the shaft 20 of the motor 13, these cone disks being urged toward each other by a coil spring 21 held on the shaft 20 by a keyed washer 22.

The effective diameter of the pulley comprising the cone disks 19 is adjusted by moving the electric motor bodily, with the shaft 20 moving in a horizontal plane transversely of itself and to various positions in parallelism to each other. This is provided by slidably mounting the motor 13 on its base and controlling its position by a stationary electric motor 23 having a threaded shaft 24 which threads through a nut carried by the electric motor 13.

It will be evident that by reversing the electric motor 23, the pulley 19 may be moved to the right or to the left, as viewed in Fig. 2, thereby changing its effective diameter for the endless belt 15. That is to say, if the screw-threaded shaft 24 is rotated in one direction, the electric motor 13 will be moved toward the left, as viewed in Figs. 1 and 2, and by rotating the screw-threaded shaft 24 in the opposite direction, the electric motor 13 will be slide toward the right. When the motor 13 is moved to the left, the effective diameter of the pulley 19 will be increased, and when the motor 13 is moved toward the right, the effective diameter of the pulley 19 will be decreased. Consequently, if the electric motor 13 is rotated at a substantially constant speed, the adjustment of the effective diameter of the pulley 19 will regulate the speed at which the conveyor 12 will be driven by the motor 13 through the belts 14, 15 and the speed reduction device 16. It will thus be seen that by controlling the direction of rotation of the small electric motor 23, the rate of travel of the belt conveyor 12 may be adjusted so as to deliver material from the hopper 10 to the screen 25, in the amounts desired.

The belt conveyor 12 transfers the material from the hopper 10 to the shaking screen 25 which may be driven by a motor 26 through suitable driving mechanism comprising an eccentric 28, to effect reciprocation of the screen 25 in its own plane. The shaking screen 25 is adapted to separate the raw coal, or coal and its impurities, according to predetermined size ranges. For instance, the screen 25 may separate the plus four inch material from the minus four inch material. Particles of the plus four inch size range of coal will travel over the shaking screen 25 acting as a chute, and deliver such material to the belt conveyor 29 by which it may be moved to picking tables for hand picking.

The minus four inch material will pass through the perforations in the shaking screen 25 into the hopper 30 immediately below, as shown in Fig. 1. The hopper 30 is arranged to deliver the minus four inch material to the belt conveyor 31 with its upper run moving in the direction of the arrow 34 at a substantially constant rate of speed, since the conveyor 31 is preferably driven by a constant speed electric motor 131, which may be of the synchronous alternating current type.

Inasmuch as it is desired to feed to the jig 33 a predetermined weight of material per unit of time, not only is the belt conveyor 31 driven at a constant speed by the electric motor 131, but the weight of the material on the belt conveyor 31 is maintained constant automatically, by associating therewith a weightometer which is arranged to operate a reversing switch to control the starting, stopping, and direction of rotation of the small electric motor 23, and thereby control the variable speed drive mechanism 18 to secure variation in rates of speed of drive of the feeding conveyor.

The weightometer mechanism 32 is in general of well-known construction and is so arranged as to weigh continuously material carried upon a portion of the belt conveyor 31. The weightometer comprises a scale beam 35 connected by the usual platform scale weighing levers to a plurality of vertical rods 136, 136, which at their lower ends are connected to a horizontal floating platform or frame 135 on which are mounted a plurality of belt idlers 137, 137, as shown in Fig. 1. It will thus be seen that the upper run of the belt 31 travels over a plurality of belt idlers 137 on the floating platform 135 which is suspended by means of four vertical rods 136 connected at their upper ends to the weighing scale mechanism by means of which the scale beam 35 is tilted up and down in accordance with the weight of the material on the section of the conveyor belt 31 traveling over the floating platform.

In a well known manner the weightometer may be adjusted so as to vary the zero position of the scale beam 35 in accordance with the desired weight of material on the discharge conveyor 31. In other words, adjustments may be made to predetermine the weight of the material on the belt conveyor 31 that will hold the scale beam 35 in equilibrium or in zero position. Such adjustments will be in accordance with the speed of the motor 131 to secure the desired rate of feed to the jig 33.

The scale beam 35 also constitutes a pivoted arm of an electric switch, comprising the stationary contacts 36 and 37, as shown in Fig. 1. This electric switch controls the small electric motor 23 by the starting, stopping and reversing of the same. As clearly shown in Figs. 1 and 3, the scale beam 35 is adapted to engage the overweight contact 37 whenever the amount of material on the belt conveyor 31 is in excess of the predetermined amount which is to be delivered to the jig 33 at the rate of speed determined by the electric motor 131. When the amount of material on the belt conveyor 31 is underweight, the underweight contact 36 will be engaged. When the main line switch 138 is closed and the weightometer has been set to maintain a predetermined weight of material on the conveyor belt 31, the scale beam 35 will be balanced in equilibrium while such predetermined weight is maintained. However, the scale beam is highly sensitive to variations of weight on the belt conveyor 31, which results in the switch arm 35 engaging either contact 36 or contact 37 to effect rotation of the motor 23 in one direction or the other and thereby automatically adjust the effective diameter of the pulley 19 and thereby vary the speed of transmission from the motor 13 to the feeding belt conveyor 12. This arrangement is such that when an overweight occurs on the belt 31, the speed of the belt conveyor 12 will be reduced automatically, and when an underweight takes place on the belt 31, the speed of the belt 12 will be increased automatically.

As shown in Fig. 3, the electric switch comprising the scale beam 35 and the stationary contacts 36, 37, controls separate windings 38 and 39, respectively, of the electric motor 23 which may be either an alternating current motor or a direct current motor. This electric motor 23 is such that when one winding 38 is energized, the motor will rotate in one direction, and when the other winding 39 is energized, the motor will rotate in the opposite direction. This is a well-known form of alternating current motor which may also be operated by direct current. If desired, the scale beam 35 may control the electric circuits and connections for effecting operation of the motor 13 at varying speeds while the latter remains mounted in a stationary position.

With the system disclosed in Fig. 1, the rate of delivery of the material to the jig 33 will be maintained constant automatically at all times. Consequently, the jig 33, which may operate on the principle of a gravity separator, will be capable of operation under the most efficient conditions, because it is recognized that to provide maximum efficiency, a jig of this type should be fed material at a constant rate according to weight. This is particularly true in the separation of impurities from coal. Without regard to the percentage of plus four inch material which passes over the screen 25 to the conveyor 29, substantially the same amount of minus four inch material continuously passes through the shaker screen 25 so as to keep the weight of material on the belt conveyor 31 constant. This is because the rate of feed of the conveyor 12 will be varied if the amount of material passing through the shaker screen 25 varies. In other words, the weightometer and the electric mechanism operated thereby, regulate the feed of the conveyor 12 to maintain constant the weight of the material on the belt conveyor 31 so as to secure a constant rate of feed of material by weight to the jig 33. The amount of plus four material passing over the screen 25 to the conveyor 29 may vary in amount, but this is immaterial because separation of the plus four material may take place at the picking tables.

It should be particularly noted that my improvements entirely eliminate the necessity for surge bins. Apparatus for the cleaning of coal and for concentration of ores requires a uniform tonnage of feed for best results. This means that variations in the proportions of the different sizes occurring in the raw material from the mine must be aqualized, which may be done by means of surge bins. The system of distribution embodying my improvements is much more satisfactory than when surge bins are employed and, moreover, is entirely automatic.

In the particular adaptation of my method and apparatus to the cleaning of run-of-mine coal, the coal may be screened at four inches, the oversize hand-picked and the undersize jigged. The weightometer is located between the feeding mechanism comprising the feeding conveyor 12, and the jig 33. The weightometer operates remote control mechanism in such a manner as to regulate the rate of flow of the run-of-mine coal from the hopper 10. For instance, if one hundred tons per hour is the desired rate of feed to the jig 33, the hook-up shown in Fig. 1 is such that whenever the tonnage of minus four inch coal drops below one hundred tons per hour, the weightometer automatically operates the remote control mechanism to effect an automatic speeding up of the feeder 12 beneath the run-of-mine coal in the hopper 10. If, on the other hand, the tonnage increases above one hundred tons per hour, the weightometer automatically causes the feed from the hopper 10 to decrease. It may be said that the run-of-mine coal in the hopper 10 is in storage and that the feed from storage is automatically varied in such a manner as to maintain constant the delivery from the discharge conveyor 31 to the jig 33. Variations in the proportions of lump coal to be hand-sorted can be taken care of readily at the picking tables to which such lump coal is delivered by the conveyor 29, whereas if variations are thrown on the jig 33, considerable readjustments are required for best results, and such necessity tends to render the jig impracticable in commercial operations.

As stated above, the feeding system of distribution is particularly adaptable to the cleaning of coal which may include mechanical screening thereof and gravity separation by means of a jig, but I wish it to be understood that the system of distribution may also be used to feed various kinds of materials gradually but continuously at a predetermined rate by weight per unit of time. It should be particularly noted that the discharge conveyor 31 is driven at a constant rate of speed by means of the alternating current or synchronous motor 131, and that the weightometer automatically operates the electric switch mechanism to effect variation of speed of delivery by the feeding conveyor 12 to the receiving end of the discharge conveyor 31. A record may be kept as to the amount of material discharged by the conveyor 31, by means of the registering device 139 operated by an endless belt 140 and the connection at 141 to the conveyor belt 31.

Inasmuch as the weightometer may be set in a well-known manner to cause a predetermined weight on the platform frame 135 to move the scale beam 35 to zero position, the system disclosed in Fig. 1 may be used as a constant weight feeder for continuously feeding and weighing materials at accurate weights. The scale comprising the platform frame 135 which carries a section of the conveyor belt 31 is highly sensitive to variations of the weight of material on the belt 31 and consequently the electric switch comprising the contacts 36, 37 responds very quickly to variations of load on the belt 31. Consequently there is a quick response in variation of feed by the belt 12, with the result that in operation the weight of the material on the belt 31 is maintained constant. It therefore follows that since the motor 131 drives the belt 31 at a constant rate of speed and the weight of material on the belt 31 is maintained constant, the discharge of any granular material from the belt conveyor 31 will be in a continuous stream which will be uniform in weight per unit of time.

Reverting to my improved method and apparatus for cleaning coal, it should be noted that the elimination of surge bins reduces the initial cost of the system and reduces materially the necessary size of the plant to house the system. Furthermore, the large hopper 10 which receives the run-of-mine coal may be used as a storage hopper, making possible the rapid unloading of coal from the mine cars and enabling the distribution system to operate continuously while operations are going on continuously at the jig and at the picking tables. These continuous operations at the jig and at the picking tables make possible the use of smaller equipment without sacrificing capacity, and reduce to a minimum the time consumed during shut-downs while waiting for more raw material to be delivered to the storage hopper 10.

Furthermore, my improved system of distribution eliminates the breakage of material which occurs when surge bins are used. By reason of the elimination of surge bins, their installation cost and the cost of the necessary structure to support such surge bins, are eliminated, and consequently the plant by the elimination of the surge bins can be made much more compact. As above stated, the placing of the only storage bin 10 at the head of the plant for the run-of-mine coal, makes possible the rapid unloading of trips from the mine.

The continuous weighing by the maintenance of the scale beam 35 in substantially zero position, and the recording of the weight of material being handled by the discharge conveyor 31, as indicated by the recording instrument 139, is a continuous check on the operation and output of the mine. In other words, the weightometer combined with the remote control mechanism enables the recording instrument 139 to be used for a record of the amount of material fed to the jig 33, and from this a fair estimate may be made as to the amount of material handled by the plant in any given time, notwithstanding the variation of the larger size range of material which passes over the screen 25 to the conveyor 29 and thence to the picking tables.

In Figs. 4 and 5 of the drawings I have shown a system for cleaning coal, which may be either an extension of the system shown in Fig. 1 except for the jig 33 which it replaces, or may be a separate and independent system. When the system shown in Fig. 4 is operated as an extension of the system shown in Fig. 1, the discharge conveyor 31 will become a feeding conveyor for the hopper 40 of Fig. 4. The hopper 40 in turn feeds a shaking screen 41 connected to a motor 42 to be reciprocated thereby in its own plane. If desired, the conveyor 31 of Fig. 1 may be arranged to feed directly onto the shaking screen 41.

When the system shown in Fig. 4 is operated as an independent system, the hopper 40 will receive coal from any source, but preferably receives sized coal, such as minus four inch coal, from a shaking screen. The pan of the shaking screen 41 is preferably provided with graduated perforations, as illustrated in Fig. 5, at 142, 143 and 144. While Fig. 5 shows these perforations distributed only over a portion of the bottom of the screen pan, it should be understood that they are disctributed entirely over such bottom, or nearly so. The graduated perforations increase in size from the upper end toward the lower end; for example, the size of the perforations 142 may be 1½ inches, the size of the perforations 143, 1⅝ inches, and the size of the perforations 144, 1¾ inches. The slight variation from 1½ inches to 1⅝ inches or even to 1¾ inches in the limiting sizes of the screen perforations controlling the feed to the jigs, will make no appreciable difference in their operation, but a variation in the tonnage will require readjustment of the two jigs 46 and 49, for best results.

Below the lower end portion of the shaking screen 41 I provide telescopically a longitudinal adjustable imperforate trough 43 which may be adjusted in telescopic relation with the screen 41 so that any material which passes over the bottom of the screen 41 will be directed into the trough 43, and in addition a variable portion of the material which passes through the screen 41 will pass into this trough 43.

Below the shaking screen 41 is mounted a feeding hopper 44, as shown in Fig. 4, and below the lower end of the trough 43 is mounted a second feeding hopper 45. The material which passes through the shaking screen 41 and is not delivered to the trough 43, will be received by the hopper 44. The material which is received by the trough 43 will be discharged from its lower end into the hopper 45. The material received in the hopper 44 will be the slack coal and this will be delivered by the conveyor 47 in the direction of the arrow 48 to the jig 46. The conveyor 47 is connected to the motor 153 to be driven thereby at a constant rate of speed. For this purpose, the motor 153 is preferably of the synchronous alternating current type. The hopper 40 may be provided with an adjustable gate 57 having a lower edge which extends transversely across the hopper and constitutes one edge of the bottom opening of the hopper. When the system shown in Fig. 4 is operated as an independent system, the hopper 40 may be a storage hopper similar to the hopper 10 in Fig. 1. In Fig. 4 the gate 57 may be adjusted to such position as to secure volumetric discharge at a constant rate while the motor 42 is operating at constant speed. The hoppers 44 and 45 are for directing the material onto the receiving ends of the conveyors 47 and 50 and are not intended to act as storage hoppers.

The material received by the hopper 45 which will be coarse coal ranging in size from 1⅝ inches up to four inches, in the example given above, will be conveyed by the belt conveyor 50 in the direction of the arrow 52 to the jig 49. The conveyor 50 is connected to a motor 152 to be driven thereby at a constant rate of speed, and for this purpose the motor 152 is preferably of the synchronous alternating current type.

Associated with the belt conveyor 50 is a weightometer mechanism 51 of the same construction as that designated 32 in Fig. 1. The weightometer 51 comprises a flat platform 135' connected to a scale beam 35' which constitutes an arm of a switch comprising the contacts 36', 37'. The weight of the material on that section of the belt traveling over the platform 135', affects the position of the scale beam 35', and overweight and underweight of material on the belt conveyor 50 will effect operation of the electric switch to control the direction of rotation of the electric motor 53. That is to say, after setting the weightometer to cause a predetermined weight on the belt conveyor 50 to establish a zero position of the scale beam, the electric motor 53 will be started, stopped or reversed in accordance with the overweight and underweight of material on the belt conveyor 50.

The electric motor 53 may be of the same type as that illustrated in Fig. 3 at 23, and each may be connected through reduction gearing to the elongated screw-threaded rod 24 or 54. The motor 53 is preferably connected through such reduction gearing to an elongated screw-threaded armature shaft 54 mounted at its outer end in a stationary bearing 55 which may serve as a support for the imperforate chute or trough 43, as illustrated in Fig. 4. At the rear end of the chute or trough 43 is a nut 56 through which the screw-threaded shaft 54 is threaded. The motor may be of relatively high speed but the movement of the chute or trough 43 is relatively slow, thereby enabling accurate adjustments to be made without overrun of the motor.

When the motor 53 is rotated in one direction in response to an overweight of material on the belt conveyor 50, the trough or chute 43 will be moved toward the right, partially out from under the reciprocable screen 41, as viewed in Fig. 4. This automatic adjustment increases the amount of material which passes through the shaker screen 41 into the hopper 44 and reduces the amount of material received by the trough 43 for passage into the hopper 45. When the motor 53 is rotated in the opposite direction in response to an underweight of material on the conveyor belt 50, the trough 43 will be automatically moved toward the left, as viewed in Fig. 4, thereby causing less material to flow into the hopper 44 and more material to flow into the trough 43, and thence into the hopper 45.

It will be evident that the weightometer mechanism 51 will be automatically operative to maintain constant the weight of material on the conveyor 50, and since the latter is being driven at a constant rate of speed, the rate of feed by weight to the jig 49 will be maintained uniform. When the system shown in Fig. 4 is used as an independent system for feeding granular material other than coal, the finest particles may be screened out and the larger particles delivered to the conveyor 50, with the assurance that by reason of the weightometer and the remote control operated thereby, the rate of feed of the larger particles of the material by weight from the discharge end of the belt conveyor 50 will be maintained constant and uniform.

In view of the foregoing it will be seen that when the system shown in Fig. 4 is used as an independent system, the run-of-mine coal may be screened to a minus four inch size range and then dumped intermittently into the large storage bin or hopper 40. The gate 57 may be adjusted to secure a flow of material from the hopper 40 to the reciprocable screen 41, which will be constant volumetrically so long as the screen 41 is vibrated at a constant rate of speed by the motor 42 and the reciprocating mechanism connected between the same and the screen 41 and including the plate 42'. The system shown in Fig. 4 automatically controls the tonnage or feed to each of the jigs 46, 49 by varying the limiting size ranges of the fed material.

In fact, the tonnage or feed to either of the jigs 46 or 49 may be varied by varying the limiting size ranges, while the conveyors 50 and 47 are being continuously driven at constant speeds by the motors 152 and 153, respectively. Consequently if the volumetric flow from the hopper 40 to the screen 41 is uniform, the feed to the jigs 46 and 49 may each be uniform in weight, but if one jig is overtaxed with a supply of material, it may be relieved by varying the size range division, and this may be effected by resetting the weightometer in accordance with the proper weight to be maintained on the belt conveyor 50.

It should be particularly noted that the size range of material for the jig 49 may be predetermined by adjustment of the weightometer. For instance, if minus two inch coal is to be excluded from the jig 49, the weightometer is so set that the corresponding weight on the belt conveyor 50 will effect automatic adjustment of the chute 43 to such a position that minus two inch coal will pass through the screen 41 into the hopper 44.

If the adjustment of the weightometer happens to be such that some minus two inch coal passes to the jig 49, the weighometer may be re-set for smaller weight on the belt conveyor 50, whereupon the scale beam electric switch and the mechanism controlled thereby will automatically readjust the chute 43 by adjusting it farther to the right to let more material pass through the screen 41 into the hopper 44. After equilibrium is established in the weightometer, the scale beam switch will act at intervals to control the weight on the belt conveyor 50 and the desired relation between the chute 43 and the screen 41.

If the amount of coarse material is relatively small, the motor 152 may be replaced by a variable speed motor and set to run at a higher speed so as to increase the capacity of feed to the jig 49, while the weight on the conveyor 50 remains constant as predetermined by the setting of the weightometer, and this weight will be maintained by the electric switch and the mechanism controlled thereby. In the same manner, the speed of the motor 153 may be increased if the proportion of the fines is relatively small. However, I prefer to employ constant speed electric motors 152 and 153 and rely upon the mechanism shown in Fig. 4 to feed predetermined size ranges of the material at the same time to the two jigs 46 and 49. Ordinarily, it will be found to be sufficient to load the hopper 40 with minus four inch coal and impurities and adjust the mechanism shown in Fig. 4 so that each of the jigs 46 and 49 will be operated at capacity. By adjustment of the weightometer, the weight of the material on the conveyor 50 may be maintained such that the feed to the jig 49 will be approximately equal in tonnage to the feed to the jig 46. This is maintained automatically, notwithstanding some variation in the proportion of the fine and coarse material in the hopper 40. The size ranges delivered to the two jigs 46 and 49 will be automatically varied under such conditions but the rate of delivery by weight to each jig 46 and 49 will be approximately maintained.

When the system of Fig. 4 is employed as an extension of the system of Fig. 1, the shaker screen 41 will receive a constant amount of material by weight from the belt conveyor 31 of Fig. 1. It therefore follows that, since a constant amount of material by weight is fed to the shaker screen 41, and a constant portion by weight of this material is fed to the jig 49, a constant portion by weight will likewise be fed to the jig 46. The adjustable gate 57 is preferably employed when the system of Fig. 4 is employed as an independent system, in which event the gate 57 will operate in the same manner as the gate 11 of Fig. 1. The gate 11 on the hopper 10 and the gate 57 on the hopper 40 are each adjustable to regulate the flow of material from the open bottoms of the hoppers.

The jigs designated 33, 46 and 49 in Figs. 1 and 4, are preferably of the wet type operating on the principle of gravity separation but the feeding systems disclosed in the accompanying drawings are also useful for feeding sized coal and impurities to jigs of the dry type having perforated decks to which the material is fed in a continuous stream at a constant rate of speed according to weight. However, as above stated, the systems disclosed in the accompanying drawings have a general application and the construction may be varied considerably in size so as to be in accordance with the feeding capacity desired. In coal cleaning systems operating to have a capacity of as much as one hundred tons per hour, considerable space must necessarily be used in comparison with that required for much smaller outfits for feeding granular material so that the rate of feed by weight will be substantially constant. When the material is such that no mechanical screening thereof is necessary, the regulated feeding conveyor 12 may deliver the material directly to the hopper 30 and thence to the conveyor 31, by omitting the shaker screen 25. It will also be noted that the three motors 13, 26 and 131 in Fig. 1 are constantly driven at the same rate of speed. Consequently, a single motor may be used for driving power transmission mechanisms extending to the pulley 19, eccentric 28 and conveyor 31, respectively. In the same manner, the motors 42, 152 and 153 of Fig. 4 may be replaced by a single motor operating suitable power transmission extensions to the reciprocating screen 41, conveyor 50, and conveyor 47, respectively. However, I prefer to use the separate electric motors, as shown in Figs 1 and 4, to facilitate separate and independent adjustment of the constant speed of each of these motors.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodi- ment of my invention, what I desire to secure by Letters Patent of the United States is:

1. The method of cleaning coal which consists in feeding a mixture of coal and impurities to a screen for screening out from the mixture the pieces below a predetermined size, feeding the screenings at a constant capacity in amount to another screen to separate the particles into two groups of different size ranges, automatically varying the size limit division between the two groups while maintaining the amount of each group constant, and separately feeding the separated mixtures to two separate jigs each thereby receiving material at constant capacity feeding rate.

2. In feeding apparatus, the combination with a reciprocable screen having openings of progressively increasing size from the feed end, of means for reciprocating said screen, an imperforate chute in telescopic relation with said screen, mechanism comprising nut and screw elements for adjusting said chute relative to said screen to regulate the valve action of said chute as to said screen, a hopper for receiving at least part of the screenings as determined by the position of said chute, another hopper for receiving from said chute the material not delivered to said first-named hopper, a conveyor for receiving material from said second-named hopper, a weightometer for weighing material on said conveyor, a motor for effecting operation of said nut and screw elements to adjust the relative positions of said screen and chute, and automatic mechanism operated by said weightometer to control said motor in accordance with the weight of material on said conveyor.

3. In feeding apparatus, the combination with a screen, of motor-driven mechanism for operating said screen, a chute associated with said screen and positioned to catch part of the material fed to said screen, mechanism comprising an electric motor for adjusting the relative positions of said screen and said chute to determine variably the amount of material fed to said chute, a conveyor in position to receive material from said chute, a weightometer for weighing material on said conveyor, means comprising an electric switch operated by said weightometer to control said electric motor in accordance with the weight of material on said conveyor while in operation, and means for driving said conveyor at a constant rate of speed to secure delivery of material in a continuous stream at a uniform rate by weight.

4. Feeding apparatus comprising the combination with a constant speed conveyor, of means for driving the same, a weightometer for weighing material on said conveyor, and automatic separator mechanism controlled by said weightometer and including means for varying the limiting size range of material delivered to said conveyor.

5. In coal cleaning apparatus, the combination with an adjustable separator to separate the coal according to size ranges, of a constant speed conveyor adapted to receive one size range of coal from said separator and feed it to a jig, a weightometer for weighing material on said conveyor, and automatic mechanism controlled by said weightometer and including means constructed and arranged to adjust said separator to vary the size range of material delivered to said jig.

6. In coal cleaning apparatus, the combination with a substantially constant capacity feeding mechanism, of an adjustable coal separator fed thereby, two separate and independent jigs, means for feeding the smaller size range of material from said separator to one of said jigs, a conveyor for delivering the material of larger size range from said separator to the other jig, a weightometer for weighing material on said conveyor, and automatic mechanism controlled by said weightometer and including means constructed and arranged to vary the size ranges delivered to each of said jigs, said weightometer being adjustable for varying the weight of material on said conveyor to enable said separator to be adjusted so as to direct substantially equal amounts of material to each of said jigs.

7. The method of cleaning coal comprising separating a constant quantity feed mixture of coal and impurities according to size ranges, feeding the separated mixtures to separate jigs, and keeping constant the feed to said jigs by varying the limiting size range of the feed to each jig to compensate for changes in the amounts of different sizes in the mixture.

8. Feeding apparatus comprising the combination with a feeding conveyor, of means for driving the same, means for feeding a substantially constant total amount of material of varying amounts in various sizes, and weight responsive means constructed and arranged to vary the limiting size range of material delivered to said conveyor as determined by the weight of material thereon and thereby maintaining constant the amount of material delivered by said conveyor.

9. The method of feeding a substantially constant amount of materials to a plurality of gravity separators while feeding different size ranges of said materials to each separator which comprises feeding a substantially constant total amount of said materials which varies from time to time in the amounts of constituent sizes of the material particles, separating the whole amount into a plurality of parts equal to the number of gravity separators, and varying the size of the material which forms the division between said parts from time to time in such a manner as to maintain the feed to each gravity separator substantially constant.

10. The method of maintaining a substantially constant quantity material feed of a selected slightly variable size range to a gravity separator which comprises feeding material having particles of a wide size range to a size separator, receiving from said size separator material having a size range less than the feed thereto and delivering it to said gravity separator, and varying a size limit of said received material particles in such a manner as to maintain constant the amount of material fed to said gravity separator.

11. The method of maintaining a constant quantity feed of raw coal of a restricted size range to a gravity separator which comprises, feeding coal to a screen separator, directing material from said screen which is classified as to size ranges so that one size range is delivered to said gravity separator, constantly measuring the quantity of coal fed to said gravity separator, and varying the extent of the size range of material fed to said gravity separator in such a manner as to compensate for variations in the amounts of the several sizes of material particles in said coal.

BYRON M. BIRD.